US012570327B2

(12) United States Patent
Zavesky et al.

(10) Patent No.: US 12,570,327 B2
(45) Date of Patent: Mar. 10, 2026

(54) AUTONOMOUS VEHICLE LOCAL RULES AND CONSTRAINTS

(71) Applicant: AT&T Intellectual Property I, L.P., Atlanta, GA (US)

(72) Inventors: Eric Zavesky, Austin, TX (US); Ginger Chien, Bellevue, WA (US); Zhi Cui, Sugar Hill, GA (US); Emily Dodwell, Metuchen, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 204 days.

(21) Appl. No.: 17/973,451

(22) Filed: Oct. 25, 2022

(65) Prior Publication Data

US 2024/0132110 A1 Apr. 25, 2024
US 2024/0227862 A9 Jul. 11, 2024

(51) Int. Cl.
*B60W 60/00* (2020.01)

(52) U.S. Cl.
CPC ... *B60W 60/00253* (2020.02); *B60W 2555/20* (2020.02); *B60W 2555/60* (2020.02)

(58) Field of Classification Search
CPC ....... B60W 60/00253; B60W 2555/20; B60W 2555/60
USPC ........................................................ 701/24
See application file for complete search history.

(56) References Cited

U.S. PATENT DOCUMENTS

| | | | | |
|---|---|---|---|---|
| 10,877,479 B2 * | 12/2020 | Landy | .................... | G08G 1/005 |
| 11,385,648 B2 * | 7/2022 | Pohl | ..................... | G05D 1/0274 |
| 2016/0031441 A1 * | 2/2016 | Foley | ................... | B60W 50/16 |
| | | | | 701/23 |
| 2016/0209220 A1 * | 7/2016 | Laetz | ..................... | G06Q 10/02 |
| 2018/0202822 A1 * | 7/2018 | DeLizio | ............ | G06Q 30/0645 |
| 2018/0211541 A1 * | 7/2018 | Rakah | .................. | G06Q 10/047 |
| 2019/0137290 A1 * | 5/2019 | Levy | ..................... | B60Q 1/507 |
| 2020/0026279 A1 | 1/2020 | Rhodes et al. | | |
| 2020/0142419 A1 * | 5/2020 | Pohl | ..................... | G05D 1/0246 |
| 2020/0242583 A1 * | 7/2020 | Sawyer | ............... | G06Q 20/127 |
| 2021/0001882 A1 * | 1/2021 | Mortazavi | ........ | G08G 1/096725 |
| 2021/0223051 A1 * | 7/2021 | Hochberg | .......... | G01C 21/3492 |
| 2024/0132110 A1 * | 4/2024 | Zavesky | ......... | B60W 60/00253 |

OTHER PUBLICATIONS

Fortem Technologies, Sky Dome Manager, "Detect and Defeat Dangerous Drones", printed on Mar. 17, 2021 https://fortemtech.com/products/skydome-manager/, 10 pages.
Steele, "DJI makes it easier to keep your drone out of no-fly zones", Jul. 5, 2016, 5 pages, https://engadget.com.

(Continued)

*Primary Examiner* — Tyler D Paige

(57) ABSTRACT

A processing system including at least one processor of an autonomous vehicle may detect that the autonomous vehicle is or will be in an unoccupied state after conveying at least one user to a location, obtain a set of local rules associated with the location, and obtain at least a first constraint associated with at least one third-party service provider associated with the location. The processing system may then execute at least one navigation action of the autonomous vehicle that is in compliance with the set of the local rules, the at least the first constraint, and at least a second constraint of the at least one user.

20 Claims, 3 Drawing Sheets

(56) References Cited

OTHER PUBLICATIONS

Burst, et al., "Defending against Intrusion of Malicious UAVs with Networked UAV Defense Swarms", 9 pages, Sep. 2, 2018, arXiv: 1808.069002[csNI].

Rasori, et al., "A Low-Cost UAV-Based Secure Location Verification Method." In Proceedings of ARES' 17 Reggio Calabric, Italy, Aug. 29-Sep. 2017, 6 pages, https://doi.org/10.1145/3098954.3098961.

Ancel, et al., "Real-time Risk Assessment Framework for Unmanned Aircraft System (UAS) Traffic Management (UTM)", 17 pages, American Institute of Aeronautics and Astronautics, https://ntrs.nasa.gov/search.jsp?R=20170005780 Mar. 13, 2020-T20:41-10+00:00z.

Larrow, "Building your Operational Risk Assessment", FAA UAS, Federal Aviation Administration AUVSI, (Date ??) 23 pages.

Perazzo, et al., "Drone Path Planning for Secure Positioning and Secure Position Verification", Article in IEEE Transactions on Mobile Computing, Nov. 2016, 16 pages, DOI:10.1109/TMC.2016.2627552. https:www.researchgate.net/publication/309894506.

Primatesta, et al., "Ground risk map for Unmanned Aircraft in Urban Environment", Reliability Engineering & System Safety, Jul. 5, 2018, 35 pages.

Abdallah, et al., "Efficient Security Scheme for Disaster Surveillance UAV Communication Networks", Jan. 29, 2019, 22 pages, Information 2019, 10, 43; doi:10.3390/info10020043, www.mdpi.com/journal information.

Su, et al., "A Stealthy GPs Spoofing Strategy for Manipulating the Trajectory of an Unmanned Aerial Vehicle", Science Direct (2016), I FAC-Papers OnLine 49-22, pp. 291-296, www.sciencedirect.com.

Tuncali, et al., "Experience Report: Application of Falsification Methods on the UxAS System", Computer Science, (2018), 7 pages,.

Poddar, et al., "Evolution of Visual Odometry Techniques", Central Scientific Instruments Organization (CSIR), Chandigarh, India, Computer Science, Computer Vision and Pattern Recognition, Apr. 2018, 12 pages, arXiv.org csarXiv:1804.11142.

Zhang, et al., "Safety Assessment and Risk Estimation for Unmanned Aerial Vehicles Operating in National Airspace System", Journal of Advances Transportation, Oct. 22, 2018, vol. 2018, Article ID 4731585, 11 pages. https://doi.org/10.1155/2018/4731585.

* cited by examiner

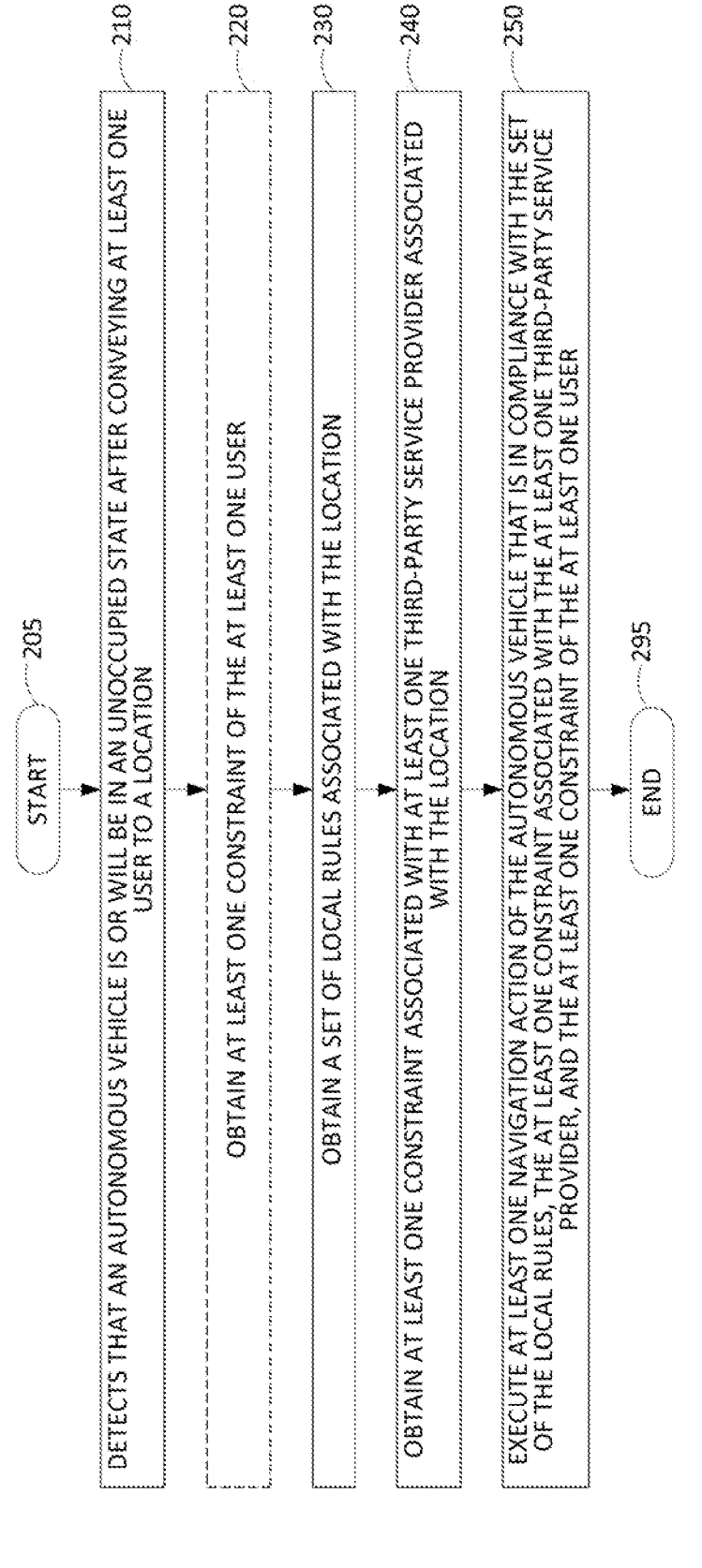

200

START 205

DETECTS THAT AN AUTONOMOUS VEHICLE IS OR WILL BE IN AN UNOCCUPIED STATE AFTER CONVEYING AT LEAST ONE USER TO A LOCATION 210

OBTAIN AT LEAST ONE CONSTRAINT OF THE AT LEAST ONE USER 220

OBTAIN A SET OF LOCAL RULES ASSOCIATED WITH THE LOCATION 230

OBTAIN AT LEAST ONE CONSTRAINT ASSOCIATED WITH AT LEAST ONE THIRD-PARTY SERVICE PROVIDER ASSOCIATED WITH THE LOCATION 240

EXECUTE AT LEAST ONE NAVIGATION ACTION OF THE AUTONOMOUS VEHICLE THAT IS IN COMPLIANCE WITH THE SET OF THE LOCAL RULES, THE AT LEAST ONE CONSTRAINT ASSOCIATED WITH THE AT LEAST ONE THIRD-PARTY SERVICE PROVIDER, AND THE AT LEAST ONE CONSTRAINT OF THE AT LEAST ONE USER 250

END 295

AUTONOMOUS VEHICLE LOCAL RULES AND CONSTRAINTS

The present disclosure relates generally to autonomous vehicles, and more particularly to methods, computer-readable media, and apparatuses for executing at least one navigation action of an autonomous vehicle that is in compliance with a set of local rules, at least a first constraint of at least one third party service provider, and at least a second constraint of at least one user.

BACKGROUND

Current trends in wireless technology are leading towards a future where virtually any object can be network-enabled and addressable on-network. The pervasive presence of cellular and non-cellular wireless networks, including fixed, ad-hoc, and/or or peer-to-peer wireless networks, satellite networks, and the like along with the migration to a 128-bit IPv6-based address space provides the tools and resources for the paradigm of the Internet of Things (IoT) to become a reality. In addition, autonomous vehicles are increasingly being utilized for a variety of commercial and other useful tasks, such as package deliveries, search and rescue, mapping, surveying, and so forth, enabled at least in part by these wireless communication technologies.

SUMMARY

In one example, the present disclosure describes a method, computer-readable medium, and apparatus for executing at least one navigation action of an autonomous vehicle that is in compliance with a set of local rules, at least a first constraint of at least one third party service provider, and at least a second constraint of at least one user. For example, a processing system including at least one processor, e.g., of an autonomous vehicle, may detect that the autonomous vehicle is or will be in an unoccupied state after conveying at least one user to a location, obtain a set of local rules associated with the location, and obtain at least a first constraint associated with at least one third-party service provider associated with the location. The processing system may then execute at least one navigation action of the autonomous vehicle that is in compliance with the set of the local rules, the at least the first constraint, and at least a second constraint of the at least one user.

BRIEF DESCRIPTION OF THE DRAWINGS

The teachings of the present disclosure can be readily understood by considering the following detailed description in conjunction with the accompanying drawings, in which:

FIG. 2 illustrates a flowchart of an example method for executing at least one navigation action of an autonomous vehicle that is in compliance with a set of local rules, at least a first constraint of at least one third party service provider, and at least a second constraint of at least one user.

To facilitate understanding, identical reference numerals have been used, where possible, to designate identical elements that are common to the figures.

DETAILED DESCRIPTION

Figure 1:
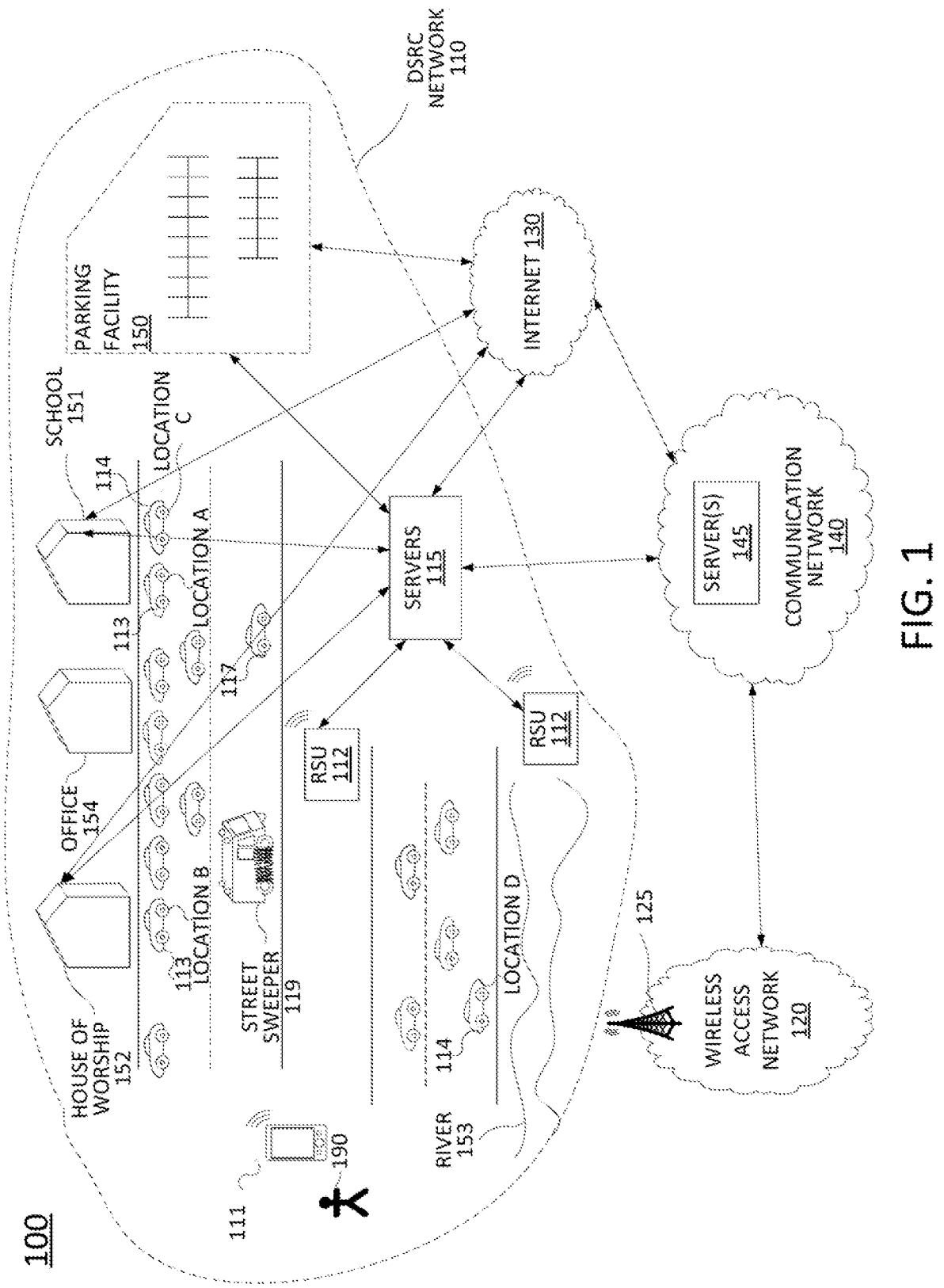
FIG. 1 illustrates an example network related to the present disclosure.

Examples of the present disclosure provide for methods, computer-readable media, and apparatuses for executing at least one navigation action of an autonomous vehicle that is in compliance with a set of local rules (i.e., one or more local rules), at least a first constraint of at least one third party service provider, and at least a second constraint of at least one user. For instance, examples of the present disclosure describe a system for local control and orchestration of autonomous vehicles (AVs). For example, a local controller associated with a location, such as a city, a region of a city, etc. may alert a parked AV to move to a new spot in response to certain conditions or for optimization of one or more criteria, such as energy savings, a need for the physical space, a reduction of traffic, and so forth. In one example, an AV owner or operator (broadly a "user") may relinquish to secondary control of the AV according to one or more predictive actions, while accommodating the user's preferences or requirements. For instance, the user may specify "I drive out on Friday. Find a closest spot for me before my weekend trip. Otherwise I don't care where you are parked." Thus, for example, if a storm is approaching, the AV may be moved to a location with overhead cover (e.g., a parking garage) or moved to higher ground. In one example, the local controller may coordinate with the AV (as well as with other AVs) to move out of an area of risk into a safer area. For example, the local controller may coordinate with multiple AVs to avoid traffic and overwhelming of resources in the safer area into which the AVs may be moved.

In one example, the present disclosure may comprise an opt-in system to allow partial/secondary control of an AV to meet social, environmental, or other locality-based needs. Thus, for instance, an AV may self-subscribe and respond to events. Alternatively, the user may register the AV when entering an area/location associated with a particular local controller. In one example, the local controller may communicate local rules as well as constraints of one or more 3$^{rd}$ parties (such as signaling for energy usage or special events), which may be wholly optional, but for which the AV may opted-in to receive and respond to notifications. In one example, an AV may earn credit for active participation in the opt-in system.

Currently, AVs may be strictly moved by instruction of the direct owners/users. This problem may be exacerbated with the addition of "swarms" of devices (e.g., autonomous fleets, drone lighting, etc.) where orchestration is also consolidated into a single entity optimizing for its own needs. In contrast, in accordance with the present disclosure, actions may be taken by an AV to solve a problem that may not be a direct concern of the user. For example, the safety, air quality, temporary space, or other needs of a locality may temporarily override the needs of an individual, for which an AV user may opt-in for environmental, social, or other need-based manipulations of his or her AV. For instance, this may include smart city optimization of land use, traffic and congestion management, or optimizing power distribution by moving vehicles to other locations (e.g., to permit charging of electric vehicles (EV) in one location that may have the least expensive energy cost, or to deploy to other regions when necessary to avoid a brown-out or local power shortage (where the EVs may include AVs that have opted-in), etc.).

In one example, the present disclosure may also account for one or more 3$^{rd}$ party constraints (e.g., as authorized by a governmental authority (e.g., via the local controller)). For instance, in one example, an AV may optimize position and movement for potential insurance claims and damage purposes (e.g., movement of AV away from more dangerous areas utilizing environment data). Notably, this automation allows the AV (on behalf of the user or as a proxy of the insurer) to move to a better/safer location. Similarly, $3^{rd}$ party constraints may convey control and advocacy by a larger institution, such as a place of worship, a medical facility, a school or childcare facility, and so forth, which may have temporary needs relating to access to parking and/or road usage. For instance, a school may have a short term need for additional curb space during pick up and drop off time windows (e.g., 15-30 minutes). As such, opted-in AVs may be requested, e.g., via the $3^{rd}$ party constraints, to temporarily relocate, e.g., vacate spaces near the school location, but may be invited to return when the $3^{rd}$ party need has passed.

It should be noted that these $3^{rd}$ party constraints may be deemed as an alternative or in addition to any local rules that may be provided to AVs by the local controller. For instance, there may be locations near a school that are designated as "no parking" from 2:45-3:20 pm. For example, the school in coordination with a governmental authority (e.g., the local town government) may have such locations so designated. In one example, these restrictions may be included in the local rules provided to the AVs by the local controller. However, there may be other parking spaces or similar locations at or near the school that are not designated as "no parking" and which are available to the general public. Nevertheless, AVs may be requested, e.g., as a courtesy, to move out during pick-up and drop-off times. Thus, for example, an AV parked and waiting for a user who is visiting a nearby office building and who does not need the AV until 5:00 PM may elect to move to another location, perhaps a different city block, in compliance with the $3^{rd}$ party constraint.

In another example, the AV may receive $3^{rd}$ party constraints while in partial operation by a user and either notify, propose an action, or override an action on the user's behalf. For instance, continuing the same example above, if a school has coordinated with a local authority to determine a "school zone" and the user is attempting to turn into that zone but has no contextual need (e.g., a commuter not having an association with the school, which may be detected via a school database of permitted staff and/or parental vehicles, or the like), the AV may be given a notification and may present the notification to the user to avoid turning into the zone. In another example, that notification may include guidance to not only avoid turning into the school zone, but also instructions on alternate routing that avoids the school zone (and which may also optimize congestion management, cost, or other factor(s)). In one example, the AV may request temporary control from the user and execute the aforementioned alternate guidance (e.g. avoiding the turn, rerouting and navigating to the primary destination on behalf of the user, who may be unfamiliar with the area, etc.). These $3^{rd}$ party constraints may be created at any level of local entity (e.g., business, educational institution, medical facility, etc.) or governmental authority, and associated with various properties of a user. To further illustrate, a $3^{rd}$ party constraint may direct or may indirectly result in rerouting non-ticket holders during a music concert, preventing users that do not have enablement needs (e.g. accessibility ramps) from entering special business zones, rerouting and subsequent automated control of an AV of a user that attempts to drive to a street location that is closed for a town fair, parade, or the like (e.g., the AV may be routed to a drop-off area or closest permissible parking instead), and so forth.

In one example, the present disclosure may also comply with one or more user requirements, such as optimizing "parking costs" and utilization (e.g., choosing between convenient daily parking and "storage" for longer term non-use) or other personal criteria (e.g., always have an extra space between AV and another parked vehicle, always move to the cheapest space (e.g., the AV is authorized to self-navigate to the least expensive parking garages in the city according to time of day, etc.), and so forth). To further illustrate, in the above example in which a school may need additional curb space during a pick up time window, an AV may choose to move when the user or owner constraints do not conflict with the $3^{rd}$ party constraints. In particular, since the user does not need the AV again until 5:00 PM, there is more than ample time to vacate the area from 2:45-3:20 PM, and to return thereafter. In one example, AVs that have moved in response to a local rule and/or $3^{rd}$ party constraint may be given priority in returning to a location (e.g., and re-securing a parking spot). For instance, other AVs may be provided with $3^{rd}$ party constraints, such as a request to not take a parking space near the school that was voluntarily vacated by another AV that will be returning. In the event the original AV that vacated the area is not able to immediately secure a space upon return, the original AV may be assigned further credits for future prioritization of access to the same or other locations, or other prioritizations (such as a prioritization to not be moved in response to a weather event or other conditions). It should be noted that not all of the $3^{rd}$ party constraints may be known in advance. For instance, in the case of the school pickup, there may usually be sufficient parking. However, there may be congestion on a nearby highway that is causing secondary congestion in front of the school as AVs and other vehicles attempt to avoid the highway traffic. In such case, the school may dynamically generate an alert, e.g., a $3^{rd}$ party constraint, in response to this temporary condition, which may be conveyed to opted-in AVs. These AVs may then select to avoid the school zone, thereby creating a greater opportunity for parents who actually need to be at the school zone to reach their children on time.

In an illustrative example, an AV of a user may first be registered to receive and respond to local alerts. In one example, this may comprise a feature that may be turned on and off, e.g., by the user. In one example, the AV capabilities may be indicated by directing a local controller to an AV profile or via explicit enumeration by messaging to the local controller. In one example, a user may decide to change the sensitivities or the triggers that the AV is to observe (e.g., civil notifications, environment or third-party triggers for a location, such as incoming weather patterns, etc.). In one example, the user may indicate whether the AV is permitted to act on its own. Alternatively, or in addition, the user may delegate control/choice to one or more entities (e.g., the local controller and/or one or more $3^{rd}$ parties, etc.). In one example, AV control and optimization may be based on "whole system" choices instead of singular user opportunities.

In one example, the local controller may receive an alert from one or more entities within an area, e.g., of congestion, a planned special event, etc. The local controller may pass alerts to an opted-in AV. A decision can be made by the AV directly or interpreted on its behalf by a local controller and/or a centralized system whether and when to implement a navigation action/movement in response to one or more trigger conditions, e.g., in accordance with one or more local rules, one or more $3^{rd}$ party constraints, and/or one or more user defined constraints. For instance, the AV may defer to user preferences, which may change according to user context, expected needs in the immediate future (e.g., as indicated on a calendar), age of the user, and safety/security of the AV or user (e.g., need to have the AV nearby at all times because of user health condition, etc.), etc.

In one example, an action of an AV may be optimized over the whole of the system (e.g., in consideration of the impact of multiple actors choosing the same choice). In one example, an AV may propose a change (e.g., a navigation action/movement), and may coordinate with other AVs and/ or the local controller. Determination of ideal condition(s) may be similarly negotiated (e.g., for a location, from a starting position to final position, etc.) to validate sustainable optimization. In one example, proposed or actual AV actions may be validated to prevent against collusion or malicious actors. For instance, multiple data sources may be consulted (e.g., multiple forecasting) to protect against unauthorized physical control/override of the AVs. For instance, the local controller may implement a contextual authentication of the original user or proxy of the user. In one example, the user may have final determination to accept/reject the execution of an action. During or after implementation of a navigation action, an AV may find anomalies or other conditions to pass to others in a same class. For instance, if an AV is moved to avoid a potential flood condition and an expected parking garage at the new location does not exist, this may be conveyed to other AVs (e.g., via the local controller) to avoid unnecessary movement only to discover the same fact. Thus, examples of the present disclosure may implement an advanced combination of strategies with at least one optimization criterion.

In one example, the present disclosure may further include autonomous control on behalf of a fleet/collective set of AVs. In one example, an AV may trigger an alert to the local controller, which may push the alert to others in the area to move away. For instance, if an AV is affected by a break-in attempt, the local controller may be notified, and may in turn notify other AVs in the area, which may choose to move away (or not) (e.g., depending on the user defined constraints such an intended time of the user's return to the AV). Similarly, police or another governmental authority may request all AVs to evacuate an area because they are potential high-probability targets (for physical or digital damage (e.g., a software virus attack, etc.)). In one example, the local controller may comprise a smart-city controller that is in communication with, and which may control, parking meters, traffic signals, lane closures, etc. Thus, for example, a network-connected parking meter may display a warning to others to not park in a space that is being held for an AV that voluntarily vacated the space in response to an alert and that intends to return back to the space shortly. In one example, local rules and/or 3$^{rd}$ party constraints may not strictly pertain to movement, but can also relate to changes in state or physical structure of AVs. For instance, it may be requested that AVs (e.g., AVs which are also EVs) to avoid charging at certain times of the day in certain location. For example, this may be to avoid power-outages or the like, and may account for the availability and type(s) of energy source(s) (e.g., solar, wind, hydroelectric, natural gas, etc.) and the demand of other uses.

Thus, examples of the present disclosure link AVs from one or more users to a local controller that may provide local rules and 3$^{rd}$ party constraints relating to a location or area. Using these rules and constraints, an AV may act on behalf of a user (or a group of users who may share the use of the same AV) without explicit engagement and operation by the primary user(s). As such, objectives that may be determined by a local controller and/or one or more 3$^{rd}$ parties may be facilitated. For instance, if a city decides to clear vehicles for a parade or to dispatch vehicles for an emergency evacuation, these and other complex events that extend beyond individual operational needs can be supported via the present disclosure.

Notably, examples of the present disclosure also provide the opportunity for additional cost-savings to AV users (e.g., owners), insurers, and the like via prevention of damage or other risks (e.g., weather-related damage, damage associated with crowds and large gatherings, etc.). In addition, location and population-specific enhancements, and flexibility with respect to demonstrated needs and use may be provided through feedback from AV users and/or 3$^{rd}$ parties associated with a location. These and other aspects of the present disclosure are discussed in greater detail below in connection with the examples of FIGS. 1-3.

To aid in understanding the present disclosure, FIG. 1 illustrates an example system 100 (e.g., one or more networks) in which examples of the present disclosure may operate. In one illustrative embodiment, the system 100 comprises a communication network, e.g., a telecommunication network 140, a wireless access network 120 (e.g., a cellular access network), a dedicated short range communication (DSRC) network 110, and the Internet 130. In one example, wireless access network 120 may comprise a Universal Terrestrial Radio Access Network (UTRAN), or an evolved Universal Terrestrial Radio Access Network (eUTRAN) and the base station 125 may comprise a NodeB or an evolved NodeB (eNodeB), or may comprise a 5G radio access network, e.g., where base station 125 may comprise a gNodeB (or gNB). In one example, the communication network 140 may comprise an Evolved Packet Core (EPC) network, or the like. In another example, communication network 140 comprises an IP network, a multi-protocol label switching (MPLS) network, etc. In still another example, the wireless access network 120 may comprise a basic service set and the base station 125 may comprise a base transceiver station (BTS). In other words, wireless access network 120 may comprise a second generation (2G) network, a third generation (3G) network, a fourth generation (4G) network and/or a Long Term Evolution (LTE) network, a 5G network, and so forth.

In one example, the wireless access network 120, the communication network 140, and/or the DSRC network 110 may be operated by different service providers, the same service provider or a combination thereof. For example, DSRC network 110 may be operated by a governmental entity or a private entity managing a transportation region on behalf of a governmental entity. On the other hand, wireless access network 120 and/or communication network 140 may be operated by a communications network service provider. Various interconnections between DSRC network 110, wireless access network 120, communication network 140, and other components are shown. In accordance with the present disclosure, it is contemplated that various communication devices may utilize any one or a combination of such networks and interfaces in order to communicate with one another.

In one example, the internal communications of the DSRC network 110 may use a 75 MHz frequency band around 5.925 GHz assigned by the Federal Communication Commission (FCC) of the United States for Intelligent Transportation Systems, or DSRC networks. In general, DSRC networks enable wireless vehicle-to-vehicle communications and vehicle-to-infrastructure communications. DSRC networks may exist for transmitting safety and road condition information to vehicles, to warn of traffic and weather, to sense nearby vehicles (e.g., blind spot detection), and so forth. In this regard, DSRC networks contemplate an on-board unit (OBU) for DSRC-enabled vehicles to transmit, as well as to receive and display messages.

Accordingly, as illustrated in FIG. 1, DSRC network 110 may interconnect and control a number of infrastructure elements, also referred to herein as roadway resources, which include roadside units (RSUs) 112. Other infrastructure elements that are not specifically illustrated in FIG. 1 may also comprise part of the DSRC network 110, e.g., traffic lights, informational signs (e.g., road-side display screens), restricted access gate(s), movable barrier gates, movable bollards, and so forth. DSRC network 110 also includes one or more servers 115 for managing infrastructure elements, for communicating with other elements and for controlling other aspects of the DSRC network 110. In one example, DSRC network 110 may comprise a hybrid network. For instance, RSUs 112 and OBUs of various vehicles and the like may communicate wirelessly in accordance with the DSRC specification(s). However, server(s) 115 may connect to RSUs 112, and computing systems of various entities (e.g., $3^{rd}$ parties, such as parking facility 150, school 151, house of worship 152, etc.), via wired connections, such as a local area network (LAN) or the like. Alternatively, or in addition, these computing systems may connect to server(s) 115 over one or more other networks (e.g., represented by Internet 130 and/or communication network 140).

Figure 3:
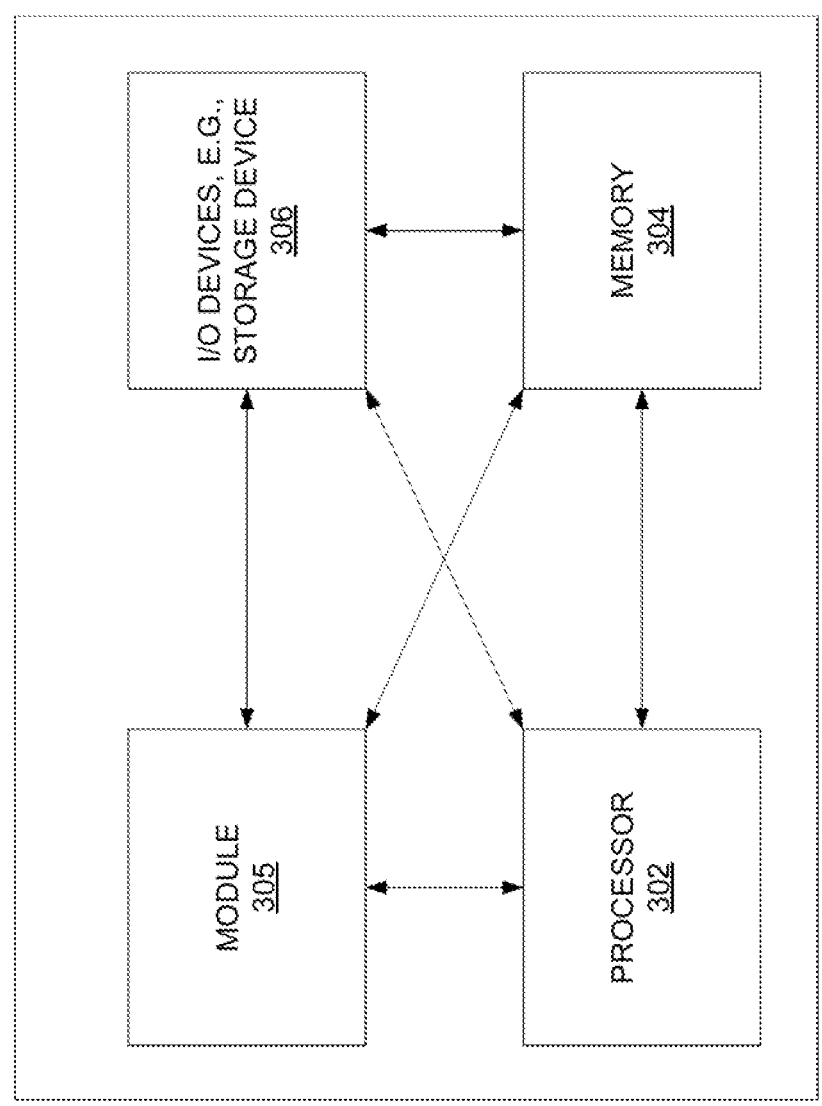
FIG. 3 illustrates a high level block diagram of a computing device specifically programmed to perform the steps, functions, blocks and/or operations described herein.

In one example, the server(s) 115 may comprise a computing system, or systems, such as one or more instances of computing system 300 depicted in FIG. 3, and may be configured to provide one or more functions in connection with examples of the present disclosure for executing at least one navigation action of an autonomous vehicle that is in compliance with a set of local rules (i.e., one or more local rules), at least a first constraint of at least one third party service provider, and at least a second constraint of at least one user. For example, server(s) 115 may be configured to perform one or more steps, functions, or operations in connection with the example method 200 described below. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, server(s) 115 may comprise one or more physical storage devices integrated therewith (e.g., a database server), or remotely accessible to server(s) 115 to store local rules, $3^{rd}$ party constraints, vehicle profiles, user profiles, and other information in accordance with the present disclosure. For example, a database server, or servers from among server(s) 115 may include a local rule database, a $3^{rd}$ party constraint database, a vehicle profile database, a user profile database, and so forth.

It should be noted that any one or more of the functions described herein with respect to the DSRC network 110 may be performed by server(s) 115 and/or a plurality of servers deployed in a distributed environment (e.g., in a "cloud-based" environment). For instance, DSRC network 110/server(s) 115 may control the timing of traffic lights, may coordinate the timing of two or more of the traffic lights in a synchronized manner, and so forth. It should also be noted that DSRC network 110 may operate in accordance with alternative or additional technologies. For instance, RSU(s) 112 may alternatively or additional comprise access points (APs) that may establish a wireless local area network (WLAN), e.g., an Institute for Electrical and Electronics Engineers (IEEE) 802.11 network (e.g., a Wi-Fi network), an IEEE 802.15, e.g., a Bluetooth network, a ZigBee network, and so forth, a mesh network comprising a combination of interconnected devices using a plurality of such communication modalities and protocols, or the like.

In addition, various vehicles illustrated in FIG. 1 may be equipped with an associated on-board unit (OBU) for communicating with the server(s) 115, e.g., via one or more of the RSUs 112. For instance, autonomous vehicles (AVs) 113 and 114, street sweeper 119, and so forth, may all be equipped with OBUs. However, in one example, other vehicles may not include OBUs for such communications, such as vehicle 117. In one example, each OBU may comprise one or more radio frequency (RF) transceivers for cellular communications and/or for non-cellular wireless communications, such as DSRC communications, IEEE 802.11-based communications, etc. To illustrate, a traffic controller may provide server(s) 115 with a warning that there is a roadway hazard at an intersection, e.g., an icing condition, an accident, etc. Accordingly, the server(s) 115 may broadcast a warning message via one or more of the RSUs 112 near the intersection. In turn, the warning may be received by the OBU of any vehicle approaching the intersection to warn or instruct the driver and/or the vehicle (e.g., an AV) to slow down and/or take other precautions. For example, the OBU may receive the message and present the text of the message on an in-vehicle display, e.g., a heads up display (HUD). Alternatively or in addition, the OBU may read the message via text-to-speech conversion. In an example of AVs (such as AVs 113 and 114), the OBU of each vehicle may comprise a navigation unit, or is connected to an associated navigation unit. For example, the OBU may include a global positioning system (GPS) navigation unit that enables the driver/user to input a destination, and which determines the current location, calculates one or more routes to the destination, and assists the driver/user in navigating a selected route. In one example, the OBU may alter a current programmed route to avoid the roadway hazard at the intersection.

The OBU of each vehicle may also be equipped to communicate with other OBUs. For instance, in general, DSRC networks enable wireless vehicle-to-vehicle (V2V) communications and vehicle-to-infrastructure (V2I) communications. Thus, in one example, AVs 113 and 114, street sweeper 119, and others may communicate with each other directly (e.g., without necessarily involving RSUs 112, server(s) 115, etc.). Alternatively, or in addition, in one example, the OBUs of each vehicle may be equipped for cellular communications. For instance, where coverage of the DRSC network 110 is weak or non-existent, wireless access network 120 and base station 125 may supplement the coverage to ensure that vehicles are not out of communication with each other and/or with server(s) 115. Similarly, in one example, AVs 113 and 114, street sweeper 119, and others may communicate with each other directly using an LTE sidelink, a 5G sidelink, or the like.

In one example, mobile device 111 may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a smartwatch, a health monitoring pendant, and the like. In one example, mobile device 111 may have both cellular and non-cellular access capabilities. Thus, mobile device 111 may be in communication with server(s) 115 via a wireless connection to base station 125 and/or to RSU(s) 112. For instance, mobile device 111 may include one or more transceivers for cellular based communications, IEEE 802.11 based communications, IEEE 802.15 based communications, DSRC-based communications, and so forth. In one example, mobile device 111 may also be equipped to communicate directly with AVs 113 and 114, street sweeper 119, and others, e.g., via DSRC-based communications, via an LTE sidelink, a 5G sidelink, or the like, and so forth. In one example, mobile device 111 may be associated with user 190, who may be the user or owner of AV 113 in the example of FIG. 1.

It should also be noted that in some examples it may be necessary or helpful to the DSRC network 110/server(s) 115 to have a lane-level accurate view of the traffic and road conditions. Accordingly, in one embodiment, server 115 may track vehicles' OBUs, mobile devices (such as mobile device 111), and so forth via RSUs 112. For instance, in addition to broadcasting and/or transmitting messages from server(s) 115 to vehicles, RSUs 112 may also interrogate OBUs of passing vehicles to determine a level of traffic, to determine which specific vehicles are travelling on the road, e.g., for toll charging and other purposes, and so forth. In one example the OBU of each vehicle may also be equipped with a Global Positioning System (GPS) unit for location sensing. In one example, the GPS unit may be configured for differential GPS (DGPS) and/or real-time kinematic (RTK) location sensing. Accordingly, an OBU may resolve its position with high accuracy via any one or more of: DSRC communications from RSUs 112, DGPS signals from one or more satellites, DGPS signals from one or more satellites in combination with RTK information from a reference receiver, and so forth. In any case, the OBU of each of vehicle may then report a determined vehicle position to the DSRC network 110/server 115. For instance, an OBU may report location via DSRC messaging to RSUs 112 and/or via cellular communications with base station 125/wireless access network 120. It should be noted that mobile devices, such as mobile device 111, may be similarly equipped and may also participate in resolving and sharing location information of mobile device 111 with server(s) 115, AVs 113 and 114, street sweeper 119, and so forth, and/or may enable mobile device locations to be determined by server(s) 115 and/or RSUs 112.

In one example, an OBU of AV 113 may comprise a computing system, or systems, such as one or more instances of computing system 300 depicted in FIG. 3, and may be configured to perform one or more functions for executing at least one navigation action of an autonomous vehicle that is in compliance with a set of local rules (i.e., one or more local rules), at least a first constraint of at least one third party service provider, and at least a second constraint of at least one user, such as illustrated in FIG. 2 and described in greater detail below in connection with the example method 200. For instance, in an illustrative example, user 190 may cause AV 113 to navigate to a location that is associated with server(s) 115 (e.g., a local controller that is designated for an area including the location). For example, the user 190 may be visiting office 154 for most of the day, where the AV 113 may find parking along the street in front of school 151 (location "A"). As the AV 113 enters the area, AV 113 may register with the server(s) 115. For instance, server(s) 115 may cause an identifier of server(s) 115 to be broadcast via RSUs 112, e.g., DSRC broadcasts, indicating that server(s) 115 is/are designated as a local controller for the area. In one example, AV 113 may thus obtain such a broadcast (e.g., via an OBU thereof), and may transmit one or more messages to server(s) 115 to register AV 113 as an opt-in participant in the area. For instance, AV 113 may transmit a "vehicle profile" to server(s) 115 indicating the preferences of AV 113 (e.g., of user 190 thereof). In one example, the message(s) may also be transmitted via DSRC, e.g., to server(s) 115 via RSUs 112.

In another example, upon entering the area (e.g., within DSRC or other wireless communication ranges of RSUs 112), the AV 113 may provide an identifier of AV 113, e.g., via DSRC broadcast or the like, which may be provided to server(s) 115. In one example, server(s) 115 may then retrieve a vehicle profile of AV 113 from a profile repository, such as server(s) 145 or another remote computing system (not shown) that may be accessible over Internet 130, for example. The vehicle profile may indicate preferences of AV 113 (or the user 190 thereof) with respect to different types of constraints that the AV 113 may honor and/or notifications regarding such constraints that the AV 113 is willing to receive. Thus, in one example, server(s) 115 may register AV 113 to receive selected alerts and/or 3$^{rd}$ party constraints. For instance, AV 113 may be registered to receive constraints relating to emergency conditions and for local 3$^{rd}$ parties. However, AV 113 may decline to receive 3$^{rd}$ party constraints of a vehicle insurer. The vehicle profile may also include preferences of user 190, such as preferences for closest-to-destination parking spots, safest parking spots, least cost parking spots, parking spots least likely to have vehicles in adjacent parking spots, parking spots near a security station, parking spots under a bright street lamp, and so forth.

In one example, any participating (e.g., opted-in) AV, or all AVs with OBUs may be provided with a set of local rules that may be broadcast by server(s) 115 via RSUs 112. The local rules may include a traffic code (e.g., traffic laws) that is/are applicable in the area. For instance, the town in which the area is located may have a "no turn on red" traffic rule. Other rules may be no parking within 50 feet of any intersection with a stop sign, no parking within 75 feet of any intersection without a stop sign, etc. Still other rules may relate to specific streets/highways (e.g., roads) or portions of such roads. For example, the town may implement a street sweeping schedule for which parking is prohibited along certain roads at certain times of the week (e.g., particular hours on particular days), may implement an alternate side parking schedule for certain roads or portions of roads, and so forth. Likewise, other rules may relate to a duration of parking in one location (e.g., 4 hours maximum parking along a portion of Main St., or the like). It should be noted that the transmission of a set of rules to participating AVs (or other vehicles with OBUs) may be in addition to street signage which may convey some or all of the same rules.

As noted above, in addition to local rules, the server(s) 115 (e.g., a local controller) may also convey one or more $3^{rd}$ party constraints to AV 113 (and to others). In one example, one or more $3^{rd}$ party constraints may be conveyed to AV 113 in connection with entering the area. Alternatively, or in addition, one or more $3^{rd}$ party constraints may be transmitted to AV 113 at a later time in connection with a temporary and unscheduled occurrence. To further illustrate, in the example of FIG. 1, the school 151 may have designed curb space along a road that is for school pick-up and drop off only. However, there may be other spaces that are for general parking, but which are convenient to the school. It may be the case that on rainy days, there is significant additional traffic for the school. For instance, fewer students may walk and there may be more vehicular traffic. As such, the school 151 may request additional accommodation from server(s) 115. In particular, server(s) 115 may generate and transmit a $3^{rd}$ party constraint, e.g., a request to AVs that are willing and able to vacate the area (or to avoid entering the area in the first place). Alternatively, or in addition, the $3^{rd}$ party constraint may request that additional parking/curb space be used for school pick-up only. Thus, for example, the $3^{rd}$ party constraint may be dynamically transmitted to AV 113, e.g., via RSUs 112. In one example, the $3^{rd}$ party constraint may also specify a time for the constraint to begin, a time to end and/or a duration, etc. (such as from 2:45 PM to 3:20 PM).

Continuing with the present example, AV 113 may then consider the local rules, the $3^{rd}$ party constraint, and any user defined constraints of user 190. For instance, user 190 may provide AV 113 with one or more user constraints, such as a time of return to the AV 113/time of intended departure, physical limitations of user 190 (for instance, user 190 may have an injured leg and may be prevented from walking long distances, and so forth). Accordingly, AV 113 may make a determination in accordance with the local rules, the $3^{rd}$ party constraint, and one or more user defined constraints whether to perform a navigation action (e.g., to move from the current location near the school 151). For illustrative purposes, AV 113 may determine that the user 190 does not need AV 113 again until 6:00 PM and that AV 113 may therefore be moved away for at least the time period of 2:45 PM-3:20 PM).

In one example, the decision may be further based on compliance with the local rules and/or one or more additional $3^{rd}$ party constraints. For instance, house of worship 152 may have a $3^{rd}$ party constraint requesting no parking in front of/near the house of worship 152 during times associated with regularly scheduled services. In this case, 2:45 PM-3:20 PM does not comprise such a time. Accordingly, AV 113 may choose to move to an open space in front of the house of worship 152, indicated as location "B."

It should be noted that other AVs may engage in the same or similar operations in accordance with the local rules, one or more $3^{rd}$ party constraints, and/or one or more user defined constraints. For instance, AV 114 may also be parked near the school 151 at the location designated as location "C." Like AV 113, AV 114 may also determine to perform a navigation action. However, AV 114 may instead choose to move to a location "D" further away and near the river 153. For example, there may be no more space available near the house of worship 152 to relocate. However, the user of AV 114 may not need AV 114 again until the following day. Thus, AV 114 may move further away, with less concern about the timing of a pickup as compared to AV 113. It should be noted that in one example, either or both of AVs 113 and 114 may also consider other $3^{rd}$ party constraints of respective insurers. For instance, it may be the case that insurer 1 of AV 113 has determined that the area near river 153 is more susceptible to loss claims, while insurer 2 of AV 114 has a different loss model that does not place as high of a risk on the area near river 153. As such, AV 114 may navigate to the location D in further consideration of the $3^{rd}$ party constraint (or lack thereof) of insurer 2. On the other hand, AV 113 may avoid this location in consideration of the $3^{rd}$ party constraint (or lack thereof) of insurer 1.

It should be noted that such $3^{rd}$ party constraints may be obtained by AVs 113 and 114 before entering the area and/or may be obtained from server(s) 115 in the same manner as other $3^{rd}$ party constraints (e.g., of school 151, house of worship 152, etc.). For instance, different insurers may have different $3^{rd}$ party constraints with respect to an area. In addition, each insurer may have different constraints for different areas. Thus, in one example, upon entering an area, an AV may be delivered with $3^{rd}$ party constraint(s) of the relevant insurer with respect to the area from server(s) 115. Similarly, different insurers may have different reactions to weather events and may therefore not generate additional $3^{rd}$ party constraints in lock-step.

It should also be noted that not all vehicles may be AVs and/or may not be equipped with OBUs capable of receiving and responding to local rules and 3 rd party constraints. Thus, for instance, not all of the vehicles legally parked near the school 151 may be caused to move in response to a request/alert (e.g., a $3^{rd}$ party constraint). However, a sufficient number may move so as to make a positive difference in providing additional curb space for a more efficient school pick-up cycle. Likewise, the compliance with local rules and/or one or more $3^{rd}$ party constraints may also provide substantial benefits to AV users and/or owners. For example, a user need not know the local rules of an area before entering and may exit the AV without concern that the AV will be ticketed for possible rule violations, e.g., parking rules, idling rules, or the like. On the other hand, vehicles not so equipped may be left to the attentiveness of the respective users. For instance, vehicle 117 may initially be parked in a location legally. However, as the time of the day progresses and the vehicle 117 remains in the same location, it may be that the vehicle 117 is in violation of a no parking restriction, e.g., no parking from 1:00 PM-2:00 PM Tuesday, for street sweeping. Thus, when street sweeper 119 approaches, vehicle 117 may be towed, ticketed, or the like. In contrast, AVs that receive local rules and $3^{rd}$ party constraints may be made aware that vehicles should not be parked along this portion of the street at the designated time(s) and may vacate the area in advance. Further still, an AV may initially fail to receive a local rule and/or $3^{rd}$ party constraint. However, the local rule and/or $3^{rd}$ party constraint may continue to be broadcast by RSUs 112 providing multiple chances for an AV to receive and react accordingly. Alternatively, or in addition, the street sweeper 119 may also broadcast its current location, intended route, etc., e.g., via DSRC messages to other DSRC capable AVs (e.g., the OBUs thereof). As such, AVs may be provided with an additional level of protection for preventing the violation of local rules and/or constraints.

It should be noted that in another example, there may not be a predefined street sweeping schedule, and/or there may be no penalties for violation. However, it may be a dynamically issued request to AVs (and/or other vehicles) to temporarily move away as a courtesy, e.g., due to an emergency situation, such as an accident, a medical emergency or a fire. Thus, the request may be similarly conveyed as a $3^{rd}$ party constraint, which AVs may then choose to honor or not (e.g., in further consideration of local rules and/or user constraints, which may indicate one or more viable or non-viable alternate locations, the ability to vacate and return by a time needed by a user, and so forth). Notably, in many cases, AV owners may desire to comply with such requests, even if not strictly required (e.g., there is no risk of penalty). For example, if the AV is parked in front of the user's home, the street may be made cleaner if the street sweeper 119 is allowed access to the curb in addition to the rest of the street. If an AV remains parked and the street sweeper 119 needs to maneuver around the AV, the result may be a less than full cleaning of the street.

Notably, in one example, AVs may be provided with credits for performing navigation actions in response to $3^{rd}$ party constraints and may be given priority in terms of access to future opportunities and/or priority in not being moved or allowed to remain in a location. To illustrate, after the designated time of the $3^{rd}$ party constraint of school 151 has passed, AVs 113 and 114 may be given priority to return to the former spaces at location A and/or location C (or very close to such locations). For example, other AVs may be provided with requests to avoid taking such spaces (e.g., an additional $3^{rd}$ party constraint from the perspective of such other AVs), even if physically available, as such spaces may be held for AV 113 and/or AV 114, which may return.

Similarly, at a later time, it may be the case that river 153 may be anticipated to reach a flood level. Thus, one or more $3^{rd}$ party constraints, e.g., from one or more insurers and/or from a local emergency services entity may be conveyed to AVs near the river 153 and/or in the area of server(s) 115 in general. In such case, many AVs may attempt to relocate in response thereto. In addition, many AVs may determine that the best alternate location is parking facility 150, which may be located on higher ground, may be a parking deck with multiple levels above ground, etc. However, parking facility 150 may not be able to accommodate all of the AVs (and/or other vehicles) causing a surge in demand. In one example, the present disclosure may assign priority among AVs according to a credit system. Thus, for example, AV 114 may have earned credit from voluntarily vacating a space near school 151 as described above. With sufficient credit, AV 114 may earn a space in parking facility 150. For instance, the parking facility 150 may impose a $3^{rd}$ party constraint of allowing only AVs with a credit over credit level or threshold "X" to use the facility. Alternatively, or in addition, server(s) 115 may identify an anticipated level of demand among AVs and the number of parking spaces available at parking facility 150, and may impose a credit cost and/or credit cap/limit in response thereto. Notably, in one example, the parking facility 150 may not be directly controlled by a local governmental authority, but knowing that the demand far exceeds the capacity of the parking facility 150, the server(s) 115 may impose such a credit cost/cap (e.g., in addition to any actual monetary charges that the parking facility 150 may choose to impose to guests).

The foregoing illustrates just several scenarios of how the system 100 may support examples of the present disclosure for executing at least one navigation action of an autonomous vehicle that is in compliance with a set of local rules, at least a first constraint of at least one third party service provider, and at least a second constraint of at least one user. Thus, it should be noted that various other operations may be included in various examples. For instance, in one example, server(s) 115 may reserve parking space in parking facility 150. Server(s) 115 may then offer the parking spaces to different AVs preferentially, e.g., those with sufficient credits earned through voluntary movement/navigation actions to accommodate $3^{rd}$ party constraints. In one example, server(s) 115 may provide an access token, e.g., to AV 113 and/or an on-board unit (OBU) of AV 113 to permit access to a selected/reserved parking spot, or a parking spot of a selected type (e.g., access to any available covered parking spot when AV 113 arrives at parking facility 150). The access token may comprise an electronic code that may also be presented by AV 113 to access parking facility 150. For instance, parking facility 150 may have a main entrance and exit with an access gate. The access gate may be opened by an attendant, or by users taking tickets from a dispenser. However, the access gate may also include an NFC sensor/ scanner that may transmit a request for a code, in response to which the OBU of AV 113 may provide the access token in response (such as via an IEEE 802.15-based communication, via a radio frequency identification (RFID) interrogation and response, etc.). The access token may be forwarded to server(s) 115 for verification (e.g., to see that the access token matches the one provided), whereupon server(s) 115 may instruct the access gate to open and permit AV 113 to enter. Thus, these and other features are all contemplated within the scope of the present disclosure.

As further illustrated in FIG. 1, communication network 140 also includes a server 145 which may perform the same or similar functions to server 115 in DSRC network 110. For example, DSRC network 110 may comprise just one portion of a region that may be collectively managed, e.g., via server(s) 145 in coordination with various local controllers, such as different instances of server(s) 115. Alternatively, or in addition, in one example a communications service provider, e.g., the operator of communication network 140 and/or wireless access network 120, may implement functions of any one or more of the embodiments described herein. For example, server(s) 145 may store and may provide local rules and $3^{rd}$ party constraints to AVs registering in an area (e.g., to opt-in to participate in such a service). Server(s) 145 may also communicate with computing systems of various $3^{rd}$ parties to receive additional/ new $3^{rd}$ party constraints as described herein, and so forth. In other words, communication network 140 may provide a service to subscribing localities, users/user devices, and/or AVs in connection with a localized, public AV management service, e.g., in addition to television, phone, and/or other communication services.

The above system 100 is described to provide an illustrative environment in which examples of the present disclosure may be employed. In other words, the system 100 is merely illustrative of one network configuration that is suitable for implementing examples of the present disclosure. Thus, the present disclosure may also include any other different network configurations that are suitable for implementing embodiments of the present disclosure. For example, wireless access network 120 may comprise a wide area network (WAN), a series of LANs and so forth. Similarly, as illustrated in FIG. 1, DSRC network 110 may interconnect infrastructure elements in the 5.9 GHz DSRC band. However, the present disclosure is not limited to any specific protocol, such as DSRC, or any particular communication medium, e.g., the particular 5.9 GHz frequency band. For example, communications between OBUs and RSUs may involve radio frequency identification (RFID) interrogation, or other forms of wireless communication. In addition, DSRC network 110 may include wired portions for connecting infrastructure elements to each other, to server(s) 115 and so forth. In one example, RSUs 112 may be integrated into other infrastructures, such as traffic lights, street lights, parking meters, public video or signage displays, and so forth. In still another example, the OBU of a vehicle may instead comprise a cellular telephone, a smart phone or other portable devices which are removable from the vehicle and which support additional functions besides DSRC messaging. Thus, networks including the above modifications and/or various additional modifications of the same or a similar nature are all included within the scope of the present disclosure.

FIG. 2 illustrates a flowchart of an example method 200 for executing at least one navigation action of an autonomous vehicle that is in compliance with a set of local rules (i.e., one or more local rules), at least a first constraint of at least one third party service provider, and at least a second constraint of at least one user, in accordance with the present disclosure. In one example, the method 200 is performed by a component of the system 100 of FIG. 1, such as by an OBU of an AV and/or any one or more components thereof (e.g., a processor, or processors, performing operations stored in and loaded from a memory), by server(s) 115, server(s) 145, and/or an OBU of an AV in conjunction with one or more other devices or computing/processing systems, e.g., a different one of the server(s) 115, server(s) 145, and/or OBUs of one or more AVs, and so forth. In one example, the steps, functions, or operations of method 200 may be performed by a computing device or system 300, and/or processor 302 as described in connection with FIG. 3 below. For instance, the computing device or system 300 may represent any one or more components of an AV, OBU, or another device, server, and/or application server in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system. The method 200 begins in step 205 and proceeds to step 210.

At step 210, the processing system (e.g., a processing system of an autonomous vehicle) detects that the autonomous vehicle is or will be in an unoccupied state after conveying at least one user to a location. For instance, the processing system may detect that the autonomous vehicle has been turned off, that the autonomous vehicle has been idle for more than a threshold duration of time (e.g., two minutes, five minutes, etc.), that one or more doors have been opened and closed, that the vehicle has been locked from the outside with a remote control, that at least one user/passenger of the autonomous vehicle has exited the autonomous vehicle at the location, etc.

At optional step 220, the processing system may obtain at least one constraint of the at least one user. For instance, the at least one constraint may be a time that the at least one user will return to the vehicle, a time that the at least one user needs to reach another location for an appointment, a maximum distance that the user is able to walk (e.g., to return to the autonomous vehicle from a current location or an anticipated location where the at least one user will be located, etc.), a physical limitation (such as information that the user has a fractured foot or the like, from which the processing system may determine a corresponding maximum distance), an indication that the autonomous vehicle is being used for a guest with limitations or needs (e.g., taking a relative with a fractured foot to the doctor), a task requirement (e.g., instructions from the user for the autonomous vehicle to complete a charging cycle before the user will need the autonomous vehicle again, instructions to complete a package pickup task, etc.), or other preferences (such as a preference for covered parking, a preference for avoiding parking fees, a preference for parking in the shade, etc.). In one example, the at least one constraint of the at least one user may be obtained from at least one user profile. Alternatively, or in addition, the at least one constraint of the at least one user may be obtained by a user input, e.g., via a graphical user interface, voice command, or other inputs in accordance with an application installed and in operation on a mobile endpoint device of the at least one user, or the like.

At step 230, the processing system obtains a set of local rules (i.e., one or more local rules) associated with the location. For instance, the set of local rules may be obtained from a computing system of a governmental entity associated with the location (and/or an area including the location), a computing system of an entity designated by the governmental entity (such as a vendor/contractor), or the like. In one example, the set of local rules may obtained upon an arrival of the autonomous vehicle in an area of the location (e.g., the location may vary in size, e.g., within a radius of 100 yards, a radius of 1000 yards, a town, a municipality, and so on. In one example, the set of local rules may comprise a time restriction for parking in at least a part of the location (e.g., in at least one space that is available for parking at the location) or a vehicle type restriction for parking in at least the part of the location (e.g., the at least one parking space). For example, the time restriction can be times of the day and/or days of the week, or can be a time limit (e.g., a four hour maximum stay). Similarly, a vehicle type restriction can be for EVs versus conventional combustion engine vehicles, hybrids or plug-in hybrids, etc., compact versus midsize or larger vehicles, commercial versus non-commercial vehicles, etc. In one example, the set of local rules may alternatively or additionally comprise an idling vehicle restriction for at least a part of the location, a standing vehicle restriction for the at least the part of the location, as well as rules for vehicular access (e.g., a reversible one lane road, a bus lane that is reserved for buses at certain hours but that is permitted to be used by other vehicles at other hours, etc.) and/or vehicular movement restrictions (e.g., no right turn or red, speed limits, etc.).

At step 240, the processing system obtains at least one constraint associated with at least one third-party service provider associated with the location. In one example, the at least one third party service provider comprises at least one of an insurer of the autonomous vehicle, a manufacturer of the autonomous vehicle, or the like. Alternatively, or in addition, in one example, the at least one third party service provider may comprise an entity having a physical presence at the location (or in an area that includes the location), such as: a school, a childcare center, a medical facility, a place of worship, etc. In one example, the at least the first constraint may comprise a time of need for a usage of a roadway (or a specific portion thereof) at the location. In one example, the at least one constraint may be obtained from the computing system of the governmental entity associated with the location. In another example, the at least one constraint may be obtained directly from a computing system of the at least one third party service provider.

It should be noted that in various examples, the at least one constraint associated with at least one third-party service provider may be obtained in response to the arrival of the autonomous vehicle in the area of the location, the detecting that the autonomous vehicle is or will be in an unoccupied state after conveying at least one user to a location, or an occurrence of at least one trigger event (e.g., a weather event (e.g., a thunder storm, a potential flood, etc.), a traffic event (e.g., a car accident, a bridge or tunnel closure, a road closure, a lane closure, etc.); or a gathering event (e.g., a conference, a parade, a local fair, an unannounced "flash mob," etc.)). For instance, the $3^{rd}$ party constraint may relate to regularly occurring events, e.g., a school pick-up or drop-off time where the school may have a $3^{rd}$ party constraint requesting AVs (or other vehicles) to voluntarily avoid certain parking spaces or areas where parking is legally permitted, a food store that may receive deliveries early in the morning, etc. In one example, the $3^{rd}$ party constraint may relate to a scheduled event that is not a regularly occurring event (e.g., a special event at a school, such as an evening concert, a back-to-school night, a school play being performed, etc., a wedding or funeral at a house of worship, etc.).

Alternatively, or in addition, the at least one $3^{rd}$ party constraint may be obtained in response to a trigger event. In one example, at least one $3^{rd}$ party constraint may be obtained upon arrival at the location and/or in the area of the location, while the at least another $3^{rd}$ party constraint may be obtained in response to at least one trigger event. To further illustrate, the at least one trigger event may comprise a weather event (e.g., an anticipated weather event or a current weather event), a traffic event, a gathering event of another $3^{rd}$ party that may affect a $3^{rd}$ party generating a new constraint, and so forth. For instance, a vehicle insurer may monitor one or more weather data feeds for the location/area and may determine that vehicles insured by the insurer should be moved to a safer location where damage/loss is deemed less likely. In another example, a house of worship may have ample on-site parking for most service times. However, when there is bad weather, many more visitors may drive instead of walk. As such, there may be further need for on-street, off-site parking that is available to the general public, but which may be more beneficially made available for use by visitors to the house of worship. Similarly, a nearby road closure may cause more vehicles than usual to park closer to a school. Thus, there may be significantly less open curb space than the school usually experiences. As such, the school may generate a new $3^{rd}$ party constraint indicating a desire for vehicles to vacate the area during a school pickup time. In still another example, a nearby office may host a conference, but may not be a participant in a system for local control and orchestration of autonomous vehicles (AVs) of the present disclosure. Thus, a school may be unaware of significant additional traffic and parking usage until it is occurring. As such, the school may dynamically generate a new $3^{rd}$ party constraint indicating a need for vehicles to vacate the area during a school pickup time. For instance, at least some of the conference attendees may have AVs that are opted-in and which may be moved out of the area (and back into the area after the school's need has passed).

In any such case, in one example, the $3^{rd}$ party may generate a new constraint by communication and request to a local controller. For example, the local controller may consider the $3^{rd}$ party constraint and if it does not conflict with other $3^{rd}$ party constraints and/or local rules, the local controller may push the $3^{rd}$ party constraint to participating AVs in the area. It should be noted that local rules and $3^{rd}$ party constraints may be defined with respect to a specified area or zone, e.g., a polygon defined by coordinates, a geofence having a defined center coordinate and a radius, or the like, may be defined by a location of a $3^{rd}$ party and a distance/radius, may be defined by specific parking spaces (e.g., where parking spaces may be numbered and maintained in a database matching parking spaces to locations on a map), and so forth.

As noted above, a local controller designated for the area/location may be associated with a governmental entity. In one example, the governmental entity may have designated the at least one third party service provider for generating constraints from a set of permitted constraints associated with the location, wherein the at least the first constraint comprises at least one constraint from the set of permitted constraints. For example, permanent accommodations may be made for entities having physical presence in an area, such as by incorporating parking restrictions, traffic flow rules, etc. into the set of local rules (e.g., no parking weekdays from 2:45 PM-3:15 PM, second lane for buses only 7:00 AM-9:30 AM and 4:30 PM-7:00 PM, etc.). However, the $3^{rd}$ party constraints may be used for similar purposes, but with respect to incidents of a temporary and/or unpredictable nature, as well as ongoing needs that may be unaddressed by local rules, etc. For instance, a governmental entity may not be willing to designate on-street parking to permanently be for the exclusive use of a house of worship. However, the governmental entity may be willing to allow the house of worship to generate one or more $3^{rd}$ party constraints that may be voluntarily honored by participating AV (and/or other vehicles).

At step 250, the processing system executes at least one navigation action (e.g., a movement) of the autonomous vehicle that is in compliance with the set of the local rules, the at least the first constraint, and the at least the second constraint of the at least one user. For instance, step 250 may include navigating the vehicle to an alternate location. In one example, step 250 may further include selecting the alternate location in compliance with the set of the local rules, the at least the first constraint (e.g., at least one $3^{rd}$ party constraint), and the at least the second constraint of the at least one user. For instance, the processing system may determine that a $3^{rd}$ party constraint is indicative that the autonomous vehicle should be moved from a current location (e.g., parked near a school at pickup time, parked in an area at increased risk of flooding, etc.). In addition, the processing system may determine that the at least one constraint of the at least one user does not conflict with the at least one $3^{rd}$ party constraint. For instance, the at least one user may not need the autonomous vehicle until after the school pick-up/drop-off time block, the user may not need the autonomous vehicle for at least 48 hours such that the autonomous vehicle may be moved out of a potential flood zone, etc.

In one example, the processing system may choose a next available closest location to move the autonomous vehicle. In one example, the processing system may also take into account parking costs, walking distance, or other factors in accordance with the at least one constraint of the at least one user. In addition, in one example, the decision may be further based on compliance with the local rules and/or one or more additional $3^{rd}$ party constraints. For instance, a next closest location to move the autonomous vehicle away from a school may be in front of a house of worship, which may have one or more $3^{rd}$ party constraints of its own. However, if the time for moving the autonomous vehicle away from the school does not coincide with a time for avoiding parking near the house of worship, this may be a viable alternative location for the processing system to select to move the autonomous vehicle. Likewise, the processing system may also cause the autonomous vehicle to comply with all local rules, such as navigating the autonomous vehicle to an alternate location while obeying speed limits and other navigation laws, rules, and/or regulations, as well as avoiding parking or standing in spaces or zones where such action is prohibited, and so forth.

In one example, selecting the alternate location may include transmitting a notification of an intended alternate location (e.g., an intended destination) to the local controller and receiving a confirmation that the alternate location is permitted or recommended. For instance, the local controller may identify an anticipated level of demand among AVs for a parking facility (e.g., in response to one or more 3 rd party constraints, such as one or more insurers' requests for AVs to move in response to a weather event, a simultaneously occurring conference that has recommended the parking facility to attendees, and so forth). Accordingly, in one example, the local controller may evaluate the number of parking spaces available at parking facility, the anticipated demand, and/or other factors, and may impose a credit costs and/or credit cap/limit in response thereto. In this regard, it should be noted that in one example, the processing system, the autonomous vehicle, and/or the at least one user may also be assigned/earn one or more "credits" from the local controller in response to voluntarily moving the autonomous vehicle, where such "credits" may be used to gain priority to access a parking facility, to remain in a location (e.g., instead of moving in response to another $3^{rd}$ party constraint at the same or a different location at another time), and so forth. In one example, 3 rd parties may incur credit usage/costs associated with $3^{rd}$ party constraints. For instance, a conference may be allowed to generate a $3^{rd}$ party constraint to attempt to gain additional nearby parking for attendees, but may incur upfront credit costs and/or credit costs in relation to the number of AVs that actually move in accommodation of the $3^{rd}$ party constraint.

Following step 250, the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200 at one or more later times at the same location and/or one or more different locations. In one example, the method 200 may include obtaining one or more new $3^{rd}$ party constraints. Similarly, in one example, the method 200 may include obtaining one or more new user constraints. For example, a user may initially indicate that the autonomous vehicle is not needed for the weekend. However, the user may have new plans which may involve the user needing the autonomous vehicle for transportation on Saturday morning. In one example, the method 200 may be performed by a local controller, e.g., wherein step 250 may include selecting an alternate location and transmitting an instruction to the autonomous vehicle to navigate to the alternate location. In one example, the method 200 may be expanded or modified to include steps, functions, and/or operations, or other features described above in connection with the example(s) of FIG. 1, or as described elsewhere herein. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the example of FIG. 2 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for executing at least one navigation action of an autonomous vehicle that is in compliance with a set of local rules, at least a first constraint of at least one third party service provider, and at least a second constraint of at least one user, and various input/output devices 306, e.g., one or more sensors, a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for executing at least one navigation action of an autonomous vehicle that is in compliance with a set of local rules, at least a first constraint of at least one third party service provider, and at least a second constraint of at least one user (e.g., a software program comprising computer-executable instructions) can be loaded into memory 304 and executed by hardware processor element 302 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for executing at least one navigation action of an autonomous vehicle that is in compliance with a set of local rules, at least a first constraint of at least one third party service provider, and at least a second constraint of at least one user (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:

detecting, by a processing system including at least one processor of an autonomous vehicle, that the autonomous vehicle is or will be in an unoccupied state after conveying at least one user to a location;

obtaining, by the processing system, a set of local rules for the location from a computing system associated with a governmental entity having jurisdiction over the location, wherein the set of local rules comprises at least one of: a rule for vehicular movement that is specific to a roadway at the location or a rule for vehicular parking that is specific to the roadway at the location;

obtaining, by the processing system, at least a first constraint associated with at least one third-party service provider associated with the location, wherein the at least one third-party service provider comprises an entity that is different from the autonomous vehicle and from the governmental entity, wherein the at least the first constraint is obtained upon an occurrence of at least one trigger event, wherein the at least one trigger event comprises a weather event, and wherein the at least the first constraint comprises a time of need for a usage of a roadway at the location by the at least one third-party service provider; and executing, by the processing system, at least one navigation action of the autonomous vehicle that is in compliance with the set of the local rules, the at least the first constraint, and at least a second constraint of the at least one user, wherein the at least the second constraint comprises at least one of: a time of pickup, a duration of an event, or a cost preference, and wherein the at least one navigation action comprises navigating the autonomous vehicle to an alternate location.

2. The method of claim 1, further comprising:

obtaining the at least the second constraint of the at least one user.

3. The method of claim 1, wherein the at least one third party service provider comprises at least one of:

an insurer of the autonomous vehicle; or a manufacturer of the autonomous vehicle.

4. The method of claim 1, wherein the at least one third party service provider comprises at least one of:

a school;

a childcare center;

a medical facility; or a place of worship.

5. The method of claim 1, wherein the at least the second constraint further comprises:

an environmental benefit preference.

6. The method of claim 1, wherein the at least the first constraint is obtained from the computing system associated with the governmental entity having jurisdiction over the location.

7. The method of claim 1, wherein the at least the first constraint is obtained from a computing system of the at least one third party service provider.

8. The method of claim 1, wherein the at least the first constraint is obtained in response to the detecting that the autonomous vehicle is or will be in the unoccupied state after conveying the at least one user to the location.

9. The method of claim 1, wherein the set of local rules is obtained upon an arrival of the autonomous vehicle in an area of the location, wherein the at least the first constraint is obtained upon at least one of:

the arrival of the autonomous vehicle in the area of the location; or the detecting that the autonomous vehicle is or will be in the unoccupied state after conveying the at least one user to the location.

10. The method of claim 1, wherein the at least one trigger event further comprises at least one of:

a traffic event; or a gathering event.

11. The method of claim 1, wherein the governmental entity has designated the at least one third party service provider for generating constraints from a set of permitted constraints associated with the location, and wherein the at least the first constraint comprises at least one constraint from the set of permitted constraints.

12. The method of claim 1, wherein the set of local rules comprises at least one of:

a time restriction for parking in at least a part of the location; or a vehicle type restriction for parking in the at least the part of the location.

13. The method of claim 1, wherein the set of local rules comprises at least one of:

an idling vehicle restriction for at least a part of the location; or a standing vehicle restriction for the at least the part of the location.

14. The method of claim 1, wherein the at least one navigation action further comprises:

selecting the alternate location in compliance with the set of the local rules, the at least the first constraint, and the at least the second constraint of the at least one user.

15. A non-transitory computer-readable medium storing instructions which, when executed by a processing system including at least one processor of an autonomous vehicle, cause the processing system to perform operations, the operations comprising:

detecting that the autonomous vehicle is or will be in an unoccupied state after conveying at least one user to a location;

obtaining a set of local rules for the location from a computing system associated with a governmental entity having jurisdiction over the location, wherein the set of local rules comprises at least one of: a rule for vehicular movement that is specific to a roadway at the location or a rule for vehicular parking that is specific to the roadway at the location;

obtaining at least a first constraint associated with at least one third-party service provider associated with the location, wherein the at least one third-party service provider comprises an entity that is different from the autonomous vehicle and from the governmental entity, wherein the at least the first constraint is obtained upon an occurrence of at least one trigger event, wherein the at least one trigger event comprises a weather event, and wherein the at least the first constraint comprises a time of need for a usage of a roadway at the location by the at least one third-party service provider; and executing at least one navigation action of the autonomous vehicle that is in compliance with the set of the local rules, the at least the first constraint, and at least a second constraint of the at least one user, wherein the at least the second constraint comprises at least one of: a time of pickup, a duration of an event, or a cost preference, and wherein the at least one navigation action comprises navigating the autonomous vehicle to an alternate location.

16. An apparatus comprising:

a processing system including at least one processor; and a computer-readable medium storing instructions which, when executed by the processing system when deployed in an autonomous vehicle, cause the processing system to perform operations, the operations comprising:

detecting that the autonomous vehicle is or will be in an unoccupied state after conveying at least one user to a location;

obtaining a set of local rules for the location from a computing system associated with a governmental entity having jurisdiction over the location, wherein the set of local rules comprises at least one of: a rule for vehicular movement that is specific to a roadway at the location or a rule for vehicular parking that is specific to the roadway at the location;

obtaining at least a first constraint associated with at least one third-party service provider associated with the location, wherein the at least one third-party service provider comprises an entity that is different from the autonomous vehicle and from the governmental entity, wherein the at least the first constraint is obtained upon an occurrence of at least one trigger event, wherein the at least one trigger event comprises a weather event, and wherein the at least the first constraint comprises a time of need for a usage of a roadway at the location by the at least one third-party service provider; and executing at least one navigation action of the autonomous vehicle that is in compliance with the set of the local rules, the at least the first constraint, and at least a second constraint of the at least one user, wherein the at least the second constraint comprises at least one of: a time of pickup, a duration of an event, or a cost preference, and wherein the at least one navigation action comprises navigating the autonomous vehicle to an alternate location.

17. The apparatus of claim 16, wherein the operations further comprise:

obtaining the at least the second constraint of the at least one user.

18. The apparatus of claim 16, wherein the at least one third party service provider comprises at least one of:

an insurer of the autonomous vehicle; or a manufacturer of the autonomous vehicle.

19. The apparatus of claim 16, wherein the at least one third party service provider comprises at least one of:

a school;

a childcare center;

a medical facility; or a place of worship.

20. The apparatus of claim 16, wherein the at least the first constraint is obtained from the computing system associated with the governmental entity having jurisdiction over the location.

* * * * *